United States Patent Office 2,970,959
Patented Feb. 7, 1961

---

2,970,959

COMPOSITION AND METHOD FOR INHIBITING SCALE

Loyd W. Jones, Tulsa, Okla., assignor to Pan American Petroleum Corporation, Tulsa, Okla., a corporation of Delaware No Drawing. Filed June 17, 1958, Ser. No. 742,486

18 Claims. (Cl. 252—8.55)

This invention relates to inhibiting scale deposition. More particularly, it relates to inhibiting the deposition of sulfate and carbonate scale from oil field brines on equipment such as well casing and tubing, separators, heater treaters, cooling equipment, flow lines, and the like. This is a continuation-in-part of my copending U.S. patent application Serial Number 453,160, filed August 30, 1954, now abandoned.

Many boiler water treating compounds are available which have excellent effects when employed to treat the relatively salt-free water used in boilers. Unfortunately, however, oil field brines normally contain high salt concentrations. The presence of these salts, in concentrations over about 1,000 p.p.m. including the sulfates and carbonates, for some unknown reason, destroys the abilities of most boiler water treating compounds to inhibit scale deposition. In addition, the volumes of water to be treated in the oil field are usually very large. Therefore, it is not economically feasible to employ high concentrations of treating agents in these brines. Since the solubility of calcium sulfate is rather high under most well conditions, scaling, when it occurs in wells, it is often due principally to the deposition of calcium carbonate. Many brines, however, contain sufficient sulfate to cause calcium sulfate deposition to be the principal scaling problem. In a large number of wells the scale which deposits is a combination of calcium carbonate and calcium sulfate.

Several commercial scale inhibitors have been found to be effective for preventing the deposition of carbonate scale of the type which adheres tightly to surfaces. The presently available commercial scale inhibitors, however, were found to be ineffective at reasonable concentrations in preventing the deposition of sulfate scale. Thus, the deposition of carbonate scale in wells can be inhibited by the use of available treating agents and is no particular problem. The deposition of sulfate scale in wells, however, when it occurs, is a very serious problem.

While sulfate scale sometimes occurs in wells, it is much more frequently a problem in surface equipment, particularly in heater treaters. This is because supersaturated solutions of calcium sulfate form readily. Scale deposits more rapidly from such solutions at elevated temperatures. Therefore, rapid deposition normally takes place on hot surfaces such as those in heater treaters or in cooling systems. Thus, a particularly serious sulfate scale problem exists in such equipment.

A specific scale problem which sometimes occurs concerns high pressure wells along the Gulf of Mexico Coast. A small amount of calcium sulfate scale is frequently found in well equipment in this area. The volume of the scale is insufficient to be a problem itself but it has been found that for some reason a particularly vicious type of corrosion occurs under such scale. The exact reason for this corrosion is not known, although it has been proposed that it may be due to a slight hydrolysis of the calcium sulfate to form sulfuric acid. Thus, a serious corrosion problem could be solved if an effective calcium sulfate scale inhibitor could be found.

Further problems involving a pellet or ball form of my scale inhibitor will be discussed later.

With the above problems in mind, it is an object of this invention to provide an inexpensive treating method for preventing or decreasing the deposition of scale, particularly calcium sulfate, in oil field equipment. Another object of this invention is to provide a scale inhibitor which is effective in the presence of at least 1,000 parts per million of salts such as are present in oil field brines. An additional object of the invention is to provide a universal inhibitor for both carbonate and sulfate scales which is operable in the presence of high concentrations of salt. A specific object of the invention is to provide a method for inhibiting corrosion in sweet oil wells in which calcium sulfate scale is present. A particular object of this invention is to provide a treating method and composition for preventing or decreasing the deposition of sulfate and carbonate scale in oil field heater treaters and similar equipment. Other objects will be apparent from the following description and claims, particularly in connection with a ball or pellet form of my scale inhibitor.

In general, I have found that sulfate scale deposition from oil field brines and similar solutions can be inhibited by introducing into the brine from about 3 to about 30 parts per million by weight of an alkali metal carboxymethyl cellulose, such as sodium carboxymethyl cellulose. Hereinafter the abbreviation CMC will be employed to indicate a carboxymethyl cellulose salt. The metallic ion of this salt is sodium unless otherwise specified. A combination of CMC with a polyphosphate such as sodium tripolyphosphate should be employed if calcium carbonate may also be present.

The term CMC as employed defines a very broad class of materials of various types. These materials can differ considerably in the degree of degradation of the cellulose to vary the chain length of anhydroglucose units. The materials can also vary in the average number of carboxymethyl groups per anhydroglucose unit. CMC is generally available in three principal types which differ in the degree of degradation. The principal difference between these types is a difference in viscosities of their aqueous solutions. The type which has been degraded to the smallest extent, and therefore contains longer chains, has the highest viscosity and hence is normally referred to as the high type. The other two types have been degraded to a greater degree and hence have shorter chain lengths and produce aqueous solutions having lower viscosities. These are normally called the medium and the low types. Recently an extra low type has been placed on the market. While all types tested to date have been found to be operable and are far superior to any other materials tested, the lower viscosity types are considerably more effective than those having longer chain lengths. Various crude technical grades of CMC have also been tested. All those tested to date have been found to be effective, particularly if present in concentrations near 20 or 30 parts per million of the brine solutions in which they are used. Some of the low viscosity crude technical grades have been found to be somewhat superior to the pure forms for unknown reasons.

The average number of carboxymethyl groups in each cellulose unit may vary within fairly wide limits. Materials have been tested with the number ranging from 0.5 up to 1.2 carboxymethyl groups per anhydroglucose unit. All of these produce scale inhibiting effects, particularly when used in higher concentrations of 20 to 30 parts per million of brine. Remarkably superior results at lower concentrations can be obtained if the degree of substitution is between about 0.3 and 1.0 carboxymethyl group per anhydroglucose unit. Materials with a lower degree of substitution do not contain sufficient carboxylic acid groups to make the materials water dispersible to the desired degree. Materials having a higher degree of substitution apparently do not retain sufficient hydroxyl groups to be highly effective.

The concentration of CMC should be at least about 3 parts per million by weight based on the brine. Even less may be used in some cases where the problem is not too serious, or where limited protection is considered adequate. For most commercial use, however, less than 3 parts per million should not be used if good protection against scale deposition and adherence is to be afforded. A maximum concentration limit of about 30 parts per million should also be observed in most cases. Higher concentrations are also effective, but since commercially satisfactory results are obtained by use of CMC concentrations of about 20 or 30 parts per million, the use of larger amounts cannot usually be justified. In some cases use of up to about 50 parts per million may be justified by special circumstances.

Most of the work with the carboxymethyl celluloses has been with the sodium salts. So far as is known, however, salts of the other alkali metals may also be used as well as salts of ammonium. With regard to ammonium salts, it should be pointed out that these compounds become unstable at temperatures above about 150° F., so use of ammonium salts should be limited to low temperature applications. Sodium salts are, in general, preferred because of larger volume production and hence more uniform quality as well as lower costs and somewhat greater effectiveness.

While the polyphosphates alone do not inhibit sulfate scale deposition to a great degree, it has been found that up to about half of the CMC can be replaced by some of the polyphosphates with little loss in effectiveness as sulfate scale inhibitors. The advantage of the substitution is that the sulfate scale inhibitor is converted by this means to one which will inhibit both sulfate and carbonate scale. The mixture of CMC and polyphosphate has a combination effect when inhibiting carbonate scale deposition. That is, a given concentration of the mixture has a greater ability to inhibit carbonate scale deposition than the same concentration of either constituent alone. This affords another reason for using the mixture wherever carbonate scaling occurs whether alone or in combination with sulfate scale. It is also obviously advisable to employ the mixture where it is uncertain what type of scale is being deposited.

It will be apparent that any ratio of polyphosphate to CMC less than about 1 to 1 can be used since pure CMC alone is effective for inhibiting calcium sulfate scale deposition. However, the ratio should not be less than about 1 to 5 if the effect of the polyphosphate is to be appreciable, particularly if low concentrations of the mixture are to be used. A ratio greater than 1 to 1 normally should not be employed in order to avoid excessive dilution of the CMC. A convenient and preferred combination is 3 parts by weight of CMC and 1 part by weight of sodium tripolyphosphate.

Several of the polyphosphates may be employed. Examples include sodium hexametaphosphate, sodium heptametaphosphate, sodium tripolyphosphate, and the like. In general, the water-soluble metaphosphates containing more than three phosphorus atoms per molecule are effective. The sodium metaphosphates have the general formula $(NaPO_3)_x$ where $x$ is an integer. Thus, sodium hexametaphosphate is $Na_6P_6O_{18}$. The water-soluble pyrophosphates are also suitable. The sodium pyrophosphates have the general formula $Na_yH_zP_2O_7$ in which $y$ and $z$ are integers, the sum of which is four. For example, tetrasodium pyrophosphate is $Na_4P_2O_7$ and sodium acid pyrophosphate is $Na_2H_2P_2O_7$.

It will be noted that all except one of the metaphosphates and all the pyrophosphates are actually polyphosphates in one sense. Reference to polyphosphates in the literature, however, may refer to a specific class of phosphates which may be considered to be chemical combinations of the pyro and meta forms. Thus, if one molecule of $Na_4P_2O_7$ and one of $NaPO_3$ can be combined, the product $Na_5P_3O_{10}$ results, which is available generally under the name sodium tripolyphosphate. The next member of the series is $Na_6P_4O_{13}$ which is sodium tetrapolyphosphate. This material can be considered a chemical combination of $Na_4P_2O_7$ and two molecules of $NaPO_3$. Actually these polyphosphates are commonly produced by means other than uniting pyrophosphates and metaphosphates. They may be most conveniently defined, however, as chemical combinations of the pyro and meta forms having the general formula $Na_4P_2O_7(NaPO_3)_x$ where $x$ is an integer.

The preferred member of the polyphosphates is sodium tripolyphosphate. It has a high phosphate content but includes sufficient metal to slow down the rate of reversion of the polyphosphate to the ortho form when dissolved in water. It has been found, for example, that a water solution of sodium tripolyphosphate can be stored for two or three weeks without serious reversion to the ortho form.

The metallic ion of the salt may be other than sodium, for example potassium, or it may be a combination of several metallic ions such as sodium and magnesium, so long as the salt retains sufficient water solubility. For my purposes the term water soluble should be interpreted to mean a solubility of at least about 1 percent in the brine to be treated. In view of the above discussion suitable phosphates for my process can be said to include water soluble metaphosphates containing more than three phosphorus atoms per molecule, pyrophosphates having no more than two hydrogen groups per molecule and chemical combinations of metaphosphates and pyrophosphates having at least one metaphosphate group for each pyrophosphate group. This class is intended to include the so-called phosphate glasses which are formed by melting phosphates having a ratio of sodium to phosphorus atoms between the one to one ratio of the metaphosphates and the two to one ratio of the pyrophosphates.

It will be apparent that mixtures of these polyphosphates may be employed. When the term polyphosphate is used hereinafter it will be intended to indicate either one or a mixture of the polyphosphates.

It is often desirable to employ scale inhibitors in the form of solid bodies such as pellets, balls, sticks, or the like. The term pellet when used hereinafter should be interpreted to include solid bodies in all forms such as balls, sticks, briquettes, and the like. The inhibitor in such form can be placed in small pots through which a part of the stream of liquids to be treated is forced to flow. As a result, the scale inhibitor slowly dissolves in the by-pass stream to produce a continuous feed of the treating agent into the principal stream. An inert organic binder slowly soluble in water is desirable for forming such balls or sticks. Many such binders exist. Examples are gelatin and ethylene oxide polymers obtainable under the trademark Carbowax. Another binder is hydrogenated sperm oil. A stick or ball can be formed by melting about two parts of the sperm oil, stirring into it about three parts of CMC and one part of sodium tripolyphosphate, and casting the resultant mixture into the desired shape. The ratio of ingredients can, of course, be varied somewhat if desired. Other hydrogenated glycerides of fatty acids, such as hydrogenated castor oil, may also be used as binders. The solid polyhydroxy alcohols such as sorbitol also are very desirable as binders.

CMC is unique in its ability to act as a binder itself. It cannot be melted and used as a binder in that way, but it can be pelleted by the application of pressure.

This is particularly true if a little water, preferably about 10 percent by weight of the CMC is added. It is a sufficiently strong binder under such circumstances to permit pelleting of the CMC alone or mixed with a polyphosphate. If sufficient care is used, the CMC will even bind together a mixture containing up to about 50 percent by weight of weighting agent such as finely divided barium sulfate or the like and up to about 20 percent by volume of a polyphosphate, the remainder being CMC. If desired, a few percent of a mold release agent such as aluminum stearate may be added to the composition before it is compressed into pellets or other forms of solid bodies.

Use of the scale inhibitor in the form of an aqueous solution is frequently desirable. Such a solution can be prepared by dissolving solid treating agents in water. For example, a stock solution may be prepared by placing the fast-dissolving form of CMC, together with any desired amount of polyphosphate, in a container, stirring in enough water to wet the powder, mashing up lumps and allowing to soak about thirty minutes or more. This soaking period apparently permits hydration of the CMC after which it disperses readily in additional water. After the soaking period sufficient water should be added to dilute the stock solution to a concentration of about one to two pounds of treating agent in 10 gallons of water. Due to the stability of the sodium tripolyphosphate or the sodium pyrophosphates, solutions of these materials can be stored for two or three weeks without serious conversion of the phosphates to the ortho form. If the methaphosphates are used, however, the solution should be used immediately after preparation or within a very few days. If no phosphate is used, the solution of CMC can be stored for several weeks.

Water solutions of CMC types other than the water-dispersible form should be prepared by adding the powdered material slowly to water which is agitated as violently as possible as by a high-speed stirrer. The principal problem is to prevent the formation of lumps of dry powder surrounded by a skin of hydrated CMC. It is helpful to mix the polyphosphate with the CMC prior to mixing the CMC into water since the polyphosphate dilutes the CMC and decreases the tendency to form lumps. Heating of the water also facilitates dispersion of the CMC into the water. Another means of aiding the dispersion is to wet the CMC powder with non-swelling liquid such as ethanol or glycerol before stirring it into the water. Sometimes it is desirable to use a corrosion inhibitor at the same time as the scale inhibitor. Many of such corroison inhibitors are suitable as dispersion aids for the CMC. An example is a high-molecular-weight amine salt of a fatty acid preferably in water-dispersible form as described further and claimed in my U.S. Patent 2,839,465.

It is recommended that about 10 gallons of the stock solution be used for each 300 barrels (of 42 gallon size) of water to be treated until a satisfactory lower limit is determined by tests. This provides a concentration of about 20 parts per million by weight. Preferably the solution should be added continuously to the stream to be treated but it may be applied in batches, particularly in wells having considerable water in the bottom. Concentrations as low as 5 parts per million have been used successfully in some cases.

In treating wells a common practice is to drop in a batch of the stock solution once a day and flush it down the space between the tubing and casing with about ten or more times its volume of well production. The amount of scale inhibitor should be calculated on the basis of about 10 to 20 parts per million of produced brine in most cases. A preliminary treatment for a few days with a somewhat higher concentration may be advisable in some cases to build up the concentration in the water in the well. If a concentration of 10 parts per million proves more than adequate, the treatment should be dropped to about 5 parts per million or less.

Brines flowing to heater treaters or through surface flow lines should be treated if the inhibitor is not being introduced into all the wells feeding the heater treaters or flow lines. In any case, some additional treatment may be desirable because scaling is more serious at the elevated temperatures in heater treaters. Since there is little, if any, reserve volume of water in treaters or lines to hold batches of treating agents and distribute them slowly into flowing streams, it is usually desirable to add the agents continuously either by flow of a portion of the stream through a pot filled with solid balls or sticks of the inhibitor or by use of a small injection pump such as a proportioning pump. It has been found, rather surprisingly however, that batch treatment of the heater treaters has been fairly satisfactory in many cases.

Many other specific applications of my scale inhibitor will occur to those skilled in the art. For example, in many cooling systems water is circulated until the content of dissolved solids, including calcium carbonate, reaches a high value. Frequently in adjusting the pH of such water sulfuric acid is added with consequent formation of calcium sulfate which deposits as a scale. My scale inhibitor is applicable to such cases to prevent both carbonate and sulfate scale deposits. The scale inhibitor is also useful in avoiding corrosion under sulfate scales by preventing the deposition of scale on the surface.

While the description has been directed to preventing deposition of sulfates and carbonates of calcium, it will be apparent that it is also applicable to inhibiting deposition of other insoluble sulfates and carbonates and other mineral scales depositing from brines.

Some problems have arisen in field use of the various forms of my scale inhibitor. As just described, the materials may be introduced as a water solution or in a solid form such as a ball or pellet with or without a separate binder. However, the solutions are rather difficult to prepare in the field. In addition, even the polyphosphates have a limited storage life in solution before they revert to the less effective orthophosphate form. For these reasons a solid pellet or ball form of the scale inhibitor has been preferred. There have also been problems with the solid forms. A pellet made up of three parts CMC, one part tripolyphosphate, and four parts barium sulfate has been prepared. This pellet, while satisfactory for use, is rather weak. It absorbs moisture upon standing whereupon it tends to split apart. Therefore, it has been necessary to coat the pellets with materials such as shellac to increase strength and improve stability during storage. This increases cost. The coated pellets have been successfully used in wells. A less expensive and stronger pellet for use in wells is desirable.

When large balls 2 or 3 inches in diameter, for example, are prepared for use in by-pass feeders, an additional problem arises. The balls do not disperse at an even rate from the surface even if no coating is present. Instead, they break apart in relatively large lumps. These, in turn, break up into smaller lumps which are rapidly swept away as solid pieces rather than as a solution. Here the problem is one of increasing the strength of the balls and insuring a slow, even rate of solution of CMC and phosphate into water flowing over the balls.

As pointed out above, binders, in addition to CMC, may be used. These binders tend to separate the particles of CMC and polyphosphate. The result is a more even rate of dispersion of balls and pellets in the water and less breakage of the balls into small pieces. It has been found, however, that, if sufficient of the hydrogenated sperm oil is used to form a strong ball or pellet, the rate of dispersion of the ball or pellet is controlled by the rather slow solution rate of this binder in water. This rate is slower than is desired for most purposes.

In addition, some of the hydrogenated animal and vegetable oils are not as constant in properties as might be desired, leading to the formation of balls and pellets having nonuniform properties. Another difficulty is that the large amount of binder required to produce a strong ball means the amount of active ingredients is greatly reduced. The ethylene oxide polymers dissolve rather quickly, are generally too low melting to be used in many oil field applications, and must be used in large concentrations.

Of the binders suggested above, I have now found that the polyhydric alcohols, such as sorbitol, are unique as binders for CMC with or without polyphosphates when these binders are used in a certain specific way. I have now also discovered that the crystalline monosaccharides, preferably in the form of hydrates, should be included in the class of polyhydric alcohols which are unique as binders for my scale inhibitor. By use of the particular class of binders and by use of a particular method of manufacture, solid forms, such as balls, pellets, and the like, can be prepared which are hard, strong, have a high density without the use of weighting agents, can be stored for long periods of time without protective coatings, and disperse slowly and evenly in water or brine.

The method of manufacture involves mixing the binder, CMC, and polyphosphate in dry powder form, heating the mixture until partial melting occurs, and compressing the mixture at the elevated temperature. For example, when powdered CMC and polyphosphates are mixed with a small amount of a powdered monosaccharide, such as d-glucose, and the mixed powders are compressed and heated, the mixture begins to melt at a temperature of about 190° F. This is close to the melting point of glucose hydrate. When other monosaccharides melting at a much higher temperature are mixed with CMC, however, these mixtures also begin to melt at about 190 to 200° F. The explanation for this behavior is not known. Small amounts of many materials cause sugars to exist as liquids at temperatures far below their melting points. Perhaps CMC is such a material. While the CMC may not actually melt, it dissolves in the sugar to form a molten mixture of the sugar and CMC. As the mixture melts, the volume of the ball or pellet decreases under the imposed pressure to form a very hard and strong solid form of the scale inhibitor when cooled. Apparently, the molten sugar and CMC flow between the particles of polyphosphate and unmelted or undissolved CMC, reducing the bulk volume of the ball or pellet and binding the mass together.

The sugar acts not only as a binder but as a dispersion regulator for the ball or pellet. These solid forms do not disperse rapidly in water as might be expected from the presence of the sugar. Instead, the combination of the sugar and CMC disperses rather slowly and evenly probably due to a mutual solution in each other as well as in water. There is little, if any, tendency of the balls and pellets to break apart into large chunks or pieces when these forms are placed in water. This is true, even though as little as about 10 percent of the monosaccharide is used. Instead, a transparent layer of CMC, sugar, and water forms on the surface of the solid form. This layer may be as much as ¼ inch thick. The CMC and sugar, together with any polyphosphates which may be present, disperse evenly from the outer surface of this transparent layer. The thin layer seems to form a seal over the outer surface of the ball or pellet. This prevents penetration of water into cracks or crevices in the ball or pellet and thus prevents breaking apart of these solid forms.

Pellets for use in wells should have a high density, preferably at least about 1.3 grams per milliliter. The high density causes rapid fall of the pellets through liquids in the wells. Balls for use in bypass feeders, on the other hand, need not have any particular density, but a higher density permits use of more balls in a smaller bypass feeder. The density of pellets formed by compressing the powders without heat is about 1 gram per milliliter. By partially melting the mixture of CMC and sugar, however, the volume of the ball or pellet can be decreased until the density is as high as about 1.5 grams per milliliter. This is sufficient to cause the pellet to fall through oil field brines without the addition of weighting agents.

Melting the sugar and CMC together greatly decreases hydration of the CMC. As a result, the balls or pellets can be stored for long periods of time without serious splitting or other deterioration. For long storage in hot, humid climates, inhibitors of bacteria, fungus, and mold growth may be included. Sodium pentachlorophenate is an example of such an inhibitor. The dry powdered bactericide can be simply mixed with the other powders before the heating and compression.

The molding temperature should not exceed about 250° F. The polyhydric alcohols, whether simple alcohols, monosaccharides, or sugar acids, begin to char or form caramel at a temperature of about 200° F. The effect is noticeable at temperatures of about 230° F. The reaction may become violent at temperatures of about 260° F. when the composition is confined in a mold. Some decomposition of CMC also occurs at elevated temperatures. I have found that even the high melting monosaccharides, such as galactose (melting point about 330° F.), when mixed with CMC melt sufficiently at about 200° F. to permit formation of a hard, strong, dense ball or pellet. Therefore, there is no particular need for using higher temperatures.

The molding pressure should be at least about 100 pounds per square inch to obtain the desired degree of compaction and strength. Preferably, the pressure should be about 500 to 5,000 pounds per square inch. Little, if any, difference can be detected between balls and pellets molded at pressures within this range. Higher pressures can, of course, be used if desired, but they are not necessary.

I have attempted to prepare balls and pellets using the preferred class of binders and other methods of forming. For example, I have attempted to melt the sugars and then stir the CMC and polyphosphates into the molten mass. This has proved to be quite impractical since large amounts of sugar must be used if the step of mixing in the powdered CMC and polyphosphates is to be carried out with any degree of ease. In addition, the melting points of most of the pure sugars are sufficiently high that some degree of decomposition of the CMC seems to occur when the CMC is stirred into the molten sugar. I have also attempted to make an aqueous solution or paste of the sugar, CMC, and polyphosphates and allow this paste to dry. The result is not at all satisfactory for several reasons. First, there is no mutual melting together of the CMC and sugar. Therefore, the rate of solution of the solid forms is not controlled in the desired way. Second, the dried forms are quite porous, permitting rapid penetration of water into the forms with a resulting rapid breaking apart of the formation. Third, the balls or pellets formed by drying a paste are very weak and cannot be handled without serious breakage. Fourth, balls and pellets formed in this way have a low density considerably below that required to cause the pellets to fall though oil field liquids. For the above reasons, it will be apparent that the method of preparing the solid forms of inhibitor using sugar as a binder and dispersing agent is quite critical.

The unique properties of the patricular class of binders seems to be due to the hydrophilic groups attached to the carbon atoms. In this class of compounds each carbon atom is attached to either a hydroxyl radical or a double bond oxygen radical. The class includes the simple alcohols such as sorbitol and erythritol in which all the carbon atoms are attached to hydroxyl groups. It includes the monosaccharides in which one carbon atom carries a double bond oxygen linkage to form an aldehyde, such as in glucose, or a ketone, such as in fructose. The class also includes the sugar acids, such as gluconic acid or tartaric acid, in which at least one carbon atom carries both a double bond oxygen and a hydroxyl group.

So far as I have been able to determine, all the monosaccharides are satisfactory for use as long as they are in a sufficiently pure form to be solids rather than syrups. I have found, however, that the polysaccharides melt at temperatures too high even in the presence of CMC to permit their use in my composition. The simpler alcohols and the sugar acids have members with melting points falling outside the operable range. The melting point should not be below about 150° F. to avoid the possibility of melting by hot brines from some wells or by the high temperatures close to some heater treaters in the field. The melting point of the polyhydroxy compound should not be above about 350° F. to insure proper melting with the CMC to form strong, hard solid forms of the inhibitor. As previously noted, ammonium carboxymethyl cellulose tends to decompose at temperatures above about 150° F. It will be apparent, therefore, that if pellets are to be formed using the polyhydroxy compounds and the heating technique, only alkali metal carboxymethyl cellulose should be used.

My invention will be better understood by reference to the following examples.

EXAMPLE I

To determine the applicability to brines of commercially available scale inhibitors used in boilers the following test was arranged. A disc of perforated sheet metal 2 inches in diameter was welded across the end of a metal tube ⅜ inch in diameter and 3 inches long. The tube was slip fitted over a vertical shaft rotated at about 20 to 30 r.p.m. by a variable speed motor. The perforated disc was at the bottom of this assembly and the shaft was at the top of the tube. An electric heater was arranged to extend from the end of the shaft into the tube. The tube and disc were immersed in a supersaturated solution of calcium sulfate. This solution was a standard one prepared by blending solutions of calcium chloride and sodium sulfate in stoichiometric amounts to form calcium sulfate in a concentration of 10,000 parts per million by weight. Sodium chloride was added to bring the total sodium chloride concentration up to 50,000 parts per million. The temperature of the solution was raised to about 170° F. by means of the electric heater and held at this point for about 2½ hours. The tube and disc assembly was then removed from the shaft and heater, rinsed with distilled water, dried, and weighed. The amount of scale was determined by subtracting the weight of the assembly as determined before the test. The results of the test are presented in Table 1. All the results were obtained by using additive concentrations of 20 parts per million.

Table 1

| Scale Inhibitor | Weight Scale, Grams | | Average Percent Inhibition |
|---|---|---|---|
| | Control | Inhibited | |
| Sodium Mannuronate [1] | .5000 | .3100 | 44.3 |
| | .4545 | .2196 | |
| Sodium Alginate | .5361 | .5774 | Scale [2] Increased Approx. 0. |
| | .4510 | .6193 | |
| Methyl Cellulose (Low Vis. Grade) | .5379 | .6068 | |
| | .5991 | .5809 | |
| Sulfited Tannin [1] | | .5174 | |
| | | .5376 | |
| Sodium Lignosulfonate [1] | .6543 | .6343 | 8.8 |
| | .6374 | .5568 | |
| Organic Colloid [1] and Phosphate | .5096 | .3066 | 34.3 |
| | .6088 | .4288 | |
| Organic Colloid [1] | .5705 | .6533 | Scale Increased 23.4. |
| | .6140 | .6454 | |
| Organic Colloid [1] and Phosphate | .5462 | .4650 | |
| | .6068 | .4178 | |
| Sodium Starch Glycolate | | .1634 | |

[1] Description given by manufacturer for materials sold under trademark.
[2] Alginate coagulated in brine, some of particles sticking to the disc and tube assembly, accounting for increase in weight.

It is apparent from the data in Table 1 that there is little, if any, correlation between compounds effective for inhibiting scale in boiler water and those effective for inhibiting scale in brines. In general, it can be said that boiler water scale inhibitors are not effective in brines. It is true that two of the better inhibitors, sodium mannuronate and the mixture of organic colloid and phosphate, were somewhat effective. At higher concentrations they were even more effective. Due to the limited extent of their effectiveness and the large amounts required, however, their use cannot be considered to be economically feasible.

EXAMPLE II

Various types of sodium carboxymethyl cellulose were tested by the procedure described in Example I. The results are presented in Table 2. The percent inhibition was calculated using an average control value of .5500 gram of scale deposited when no treating agent was used.

Table 2

| Type of Carboxymethyl Cellulose | Conc., p.p.m. | Weight Scale, grams | Average Percent Inhibition |
|---|---|---|---|
| 70 Low | 20 | [2] —.0026 | 100 |
| | | [2] —.0045 | |
| 70 High | 20 | .0060 | 98.9 |
| 120 High | 20 | .0273 | 93.2 |
| 70 CT Extra Low | 10 | .0020 | 99.6 |
| 70 CT Low | 10 | .0076 | 98.6 |
| 70 Extra Low | 10 | .0103 | 98.1 |
| 50 Medium | 10 | .0116 | 97.9 |
| 70 Low | 10 | .0285 | 94.8 |
| Pectinol 70 High [1] | 10 | .0664 | 87.1 |
| 70 High | 10 | .1179 | 78.6 |
| 120 Medium | 10 | .2575 | 53.2 |
| 120 High | 10 | .2650 | 51.8 |
| Pectinol 70 CT Low [1] | 5 | .0817 | 85.1 |
| 70 CT-F Low | 5 | .1043 | 81.4 |
| 70 CT Extra Low | 5 | .1505 | 72.3 |
| | | .1540 | |
| 70 CT Low | 5 | .1815 | 70.9 |
| | | .1380 | |
| Pectinol 70 High [1] | 5 | .3105 | 43.5 |

[1] The term Pectinol refers to an enzyme sold under the trademark Pectinol B. These samples were treated with the enzyme in an effort to degrade the cellulose to a lower molecular weight form.
[2] The loss in weight is due to a slight corrosion of the disc and tube assembly by the brine. No scale deposition whatsoever was visible on the assembly.

The terms high, medium, low, and extra low indicate the viscosity type of the material. The numbers 120, 70, and 50 indicate respectively an average of 1.2, .7, and .5 carboxymethyl groups per anhydroglucose unit of the cellulose. The letters CT stand for crude technical grade. The letter F indicates a fast dissolving form obtained by treating CMC in some unknown manner. From Table 2 it will be apparent that in general all types of CMC can be employed in concentrations above about 3 or 4 parts per million by weight of brine. It is also obvious, however, that the low and extra low types which have been degraded to a high degree are more effective. In addition it will be observed that the number of carboxymethyl groups should be held to a low value, preferably in the range of about .3 to 1.0 carboxymethyl group per anhydroglucose unit for best results. The effects of the enzyme merely emphasize the importance of a highly degraded type of cellulose. A comparison of the data in Tables 1 and 2 shows clearly the surprising superiority of CMC over the best boiler treating compounds when applied to preventing deposition of adherent scale from brines. It should be particularly noted that methyl cellulose, which is an equivalent of CMC for most purposes, is far from an equivalent for this purpose. Even sodium starch glycolate, the starch equivalent of CMC, while superior to most boiler treating compounds is not an equivalent in scale inhibiting ability to even the less desirable type of CMC in the same concentration of 20 parts per million.

EXAMPLE III

To determine if a universal brine scale inhibitor for both sulfate and carbonate scales could be obtained, the effects of substituting polyphosphates for some of the CMC were tested by the method described in Example I. The results are presented in Table 3. Again the percent inhibition is calculated on the basis of an average control value of .5500 gram of scale.

*Table 3*

| Scale Inhibitor | Conc., p.p.m. | Weight Scale, grams | Average Percent Inhibition |
|---|---|---|---|
| Sodium Tripolyphosphate | 10 | .4158 .3863 | 27.1 |
| CMC 70 Low | 10 | .0285 .0556 | 94.8 |
| CMC 70 Low and Sodium Tripolyphosphate | 5 of each | .0727 | 88.3 |
| CMC 70 Low Sodium Tripolyphosphate Hydrogenated Sperm Oil | 13 4 8 | .0108 .0174 | 97.4 |

It will be noted that when sodium tripolyphosphate is substituted for half the CMC the scale inhibiting ability is decreased slightly but not seriously. The last item in the table is a solid stick inhibitor employing hydrogenated sperm oil as a binder for the CMC and phosphate. Here it will be observed that the scale inhibition is about what would be expected, from the data in Table 2, of 13 parts per million of CMC alone. Perhaps the degree of inhibition is a little better than would be expected.

EXAMPLE IV

To determine the effectiveness of the CMC and phosphate mixture on the carbonate portion of the mixed scales in brines, tests were conducted employing the method of Example I, except that the brine solution was prepared by mixing an excess of solid calcium carbonate into a 5 percent sodium chloride brine (50,000 parts per million) and then bubbling carbon dioxide through the brine for several hours in an effort to saturate the brine with calcium bicarbonate. Unfortunately, the degree of saturation varied with different samples of calcium carbonate so a control test had to be run with each test of a scale inhibitor to permit proper evaluation of the results in view of variations in the brine. Results of the tests are presented in Table 4.

*Table 4*

| Scale Inhibitor | Conc., p.p.m. | Weight Scale, grams Control | Weight Scale, grams Inhibited | Percent Inhibition |
|---|---|---|---|---|
| Sodium Tripolyphosphate | 10 | .0807 | .0080 | 90.1 |
| CMC 70 High | 10 | .1528 | .1093 | 28.5 |
| Sodium Tripolyphosphate | 5 | .0800 | .0061 | 92.4 |
| CMC 70 High | 5 | | | |
| CMC CT-F 70 Low | 5 | .0647 | .0210 | 69.4 |
| Sodium Tripolyphosphate | 2½ | .0647 | .0060 | 90.7 |
| CMC CT-F 70 Low | 2½ | | | |

The data show that sodium tripolyphosphate is a very good carbonate scale inhibitor in brine when used alone at a concentration of 10 parts per million by weight. A more effective carbonate scale inhibitor can be obtained, however, by substituting CMC for part of the phosphate due to the combination action of these materials. That is, 10 parts per million of the mixture is obviously more effective than 10 parts per million of either constituent alone, even when the CMC is the relatively less effective high viscosity type. The greater effectiveness, as carbonate scale inhibitors, of the lower viscosity type of CMC is also apparent from the table. Due to this greater effectiveness, it is possible to obtain better than 90 percent inhibition of adherent scale deposition by the combined action of CMC and phosphate when the mixture is used in a concentration of only 5 parts per million. The greater effectiveness of the lower viscosity types of CMC is particularly important in applications such as heater treaters where the higher temperatures may cause rapid reversion of the polyphosphates to the ortho form, leaving only the CMC to act as the carbonate scale inhibitor.

EXAMPLE V

The scale inhibitor was made up in pellet form using several compositions. In every case a hydraulically actuated pressure mold was used. Heat was applied to the pellets by means of an electrically heated jacket around the mold. A thermometer in one of the mold pistons near the surface of the pellet indicated the approximate temperature of the pellet. All pellets were 1½ inches in diameter and contained about 50 grams of materials. In all cases except Tests 24 and 25 the scale inhibitor consisted of three parts of sodium carboxymethyl cellulose and one part of sodium tripolyphosphate by weight.

*Table 5*

| Test No. | Binder Type | Binder Conc., percent | Mold Pressure, lb./sq. in. | Mold Temp., °F. | Pellet Density, gr./ml. | Solubil. Rate, gr./hr. | Compressive Strength, lb./sq. in. |
|---|---|---|---|---|---|---|---|
| 1 | 100% Inhibitor | | 500 | 190 | .98 | [1] 9.6 | 20 |
| 2 | Dextrose | 10 | 500 | 190 | 1.16 | | 450 |
| 3 | do | 10 | 500 | 210 | 1.40 | 10.6 | |
| 4 | do | 10 | 500 | 220 | 1.55 | 9.3 | 2,000 |
| 5 | do | 20 | 5,000 | 75 | 1.10 | [1] 14.6 | 20 |
| 6 | do | 20 | 500 | 190 | 1.17 | 13.6 | 1,200 |
| 7 | do | 20 | 500 | 220 | 1.26 | | 2,000 |
| 8 | do | 20 | 500 | 260 | Pellet exploded | | |
| 9 | do | 40 | 500 | 190 | 1.50 | 20.6 | |
| 10 | do | 40 | 500 | 200 | 1.50 | | |
| 11 | do | 40 | 500 | 220 | 1.50 | 20.5 | 1,500 |
| 12 | do | 60 | 500 | 190 | 1.50 | 24.5 | 800 |
| 13 | do | 60 | 500 | 220 | 1.47 | 24.5 | 500 |
| 14 | do | 80 | 500 | 190 | Pellet gummy and impractical | | |
| 15 | Sorbitol | 20 | 500 | 190 | 1.50 | 10.2 | 500 |
| 16 | do | 20 | 500 | 220 | 1.50 | 11.0 | 1,000 |
| 17 | Galactose | 20 | 500 | [2] 190 | 1.35 | 12.4 | 800 |
| 18 | do | 20 | 500 | 220 | 1.45 | 7.7 | 1,500 |
| 20 | Levulose | 20 | 500 | 190 | 1.50 | | 1,200 |
| 21 | do | 20 | 500 | 220 | 1.60 | 11.2 | 2,000 |
| 22 | do | 20 | 150 | 225 | 1.52 | | 2,000 |
| 23 | Maracarb | 20 | 500 | 190 | 1.45 | 12.7 | 5,000+ |
| 24 | Dextrose [3] | 20 | 500 | 190 | 1.15 | | |
| 25 | do [3] | 20 | 500 | 215 | 1.26 | | 2,000 |

[1] Pellets broke apart into small pieces during solubility test.
[2] Little, if any, melting occurred in the center of the pellet.
[3] Pellets 24 and 25 contained only dextrose and CMC.

The properties of the pellets formed using various binders under several conditions are reported in Table 5. The solubility rate was determined by passing water at a temperature of about 150° F. upwardly around a pellet in a 2 inch diameter tube. The rate of flow of water was about 4 liters per minute.

The possibility of forming a pellet having a density of about 1.5 grams per milliliter will be apparent. The lower densities reported in tests 6 and 7, for example, are probably due to not holding the pellet at the elevated temperature and pressure for a sufficiently long period of time. The effects of incomplete melting are particularly noticeable in test 17. In this test the galactose used was an anhydrous form having a melting point of about 330° F. Only the outer surface of the pellet was thoroughly melted, accounting for the rather low compressive strength. Tests 20 and 21 using the low melting levulose, on the other hand, formed strong and very dense pellets. This was probably due to the ease of melting the composition. These pellets were somewhat translucent due to the complete melting action which took place.

The lower strengths reported in tests 12, 13, and 15 are somewhat misleading. In these cases the pellets did not shatter or break apart but merely deformed without breaking. They are tough and seem to be perfectly satisfactory. This is in contrast to the pellets in tests 1, 2, 5, and 17 which definitely fractured. The pellets from tests 1 and 5 were much too weak to be handled. The weakness of the pellet in test 1 shows the importance of the polyhydroxy compound in strengthening the pellet. The weakness of the pellet in test 5 shows the necessity of the heat and pressure for forming a strong pellet. The rather easily deformed nature of the pellets containing 60 percent dextrose shows that the amount of polyhydroxy compound should not greatly exceed the weight of scale inhibitor. The rather weak nature of the pellet resulting when only 10 percent binder was used at low temperatures in test 2 indicates the quantity of binder should not be much less than 10 percent of the weight of the entire composition.

The difficulty of forming a good pellet using the high-melting galactose, together with the results reported in test 8, shows why the polyhydroxy compound should not have a melting point much above that of galactose.

Maracarb is a trademark for a material recovered from waste sulfite liquor produced in paper manufacture. It is described as containing some sodium and calcium lignosulfonates, but as being made up largely of wood sugar reversion products such as gluconic acid. The good results demonstrate the operability of these acid products as binders.

Tests 24 and 25 are included to show the operability of the polyhydroxy compounds in the absence of the polyphosphates usually included in the scale inhibitor.

The possibility of adjusting the solution rate by changing the binder concentration is apparent. It should be noted, however, that an increase in binder concentration to increase the over-all solutoin rate may decrease the concentration of scale inhibitor so greatly that the faster dissolving pellet may actually place scale inhibitor in solution at a slower rate. This is true, for example, of the pellet containing 60 percent dextrose compared to those containing 20 and 40 percent dextrose.

Test 23 shows that good pellets can be formed at very low molding pressures.

EXAMPLE VI

A batch of scale inhibitor balls about 3 inches in diameter was made up on a steam heated commercial molding machine in which the hydraulic pressure was about 10,000 pounds per square inch. The composition of these balls was 20 percent dextrose, 20 percent sodium tripolyphosphate, and 60 percent sodium carboxymethyl cellulose. The balls were heated to a temperature of about 190 to 200° F. These balls were stored in an open drum for a period of more than six months during a field test. The balls at the end of the six-month period were perfectly satisfactory. None of them had broken apart, and all remained strong and usable. In the field test the balls were used in a by-pass feeder at a rate of about one ball per day to treat a water-oil mixture containing about 70 barrels per day of water. The mixture then passed to a heater treater. Examination of the treater after three months showed the treater to be in much better condition than after using a solution of polyphosphate and CMC to treat the water going to the treater. The water solution in turn had already proven highly successful in decreasing scale formation in the heater treater.

From the above description and data it will be apparent that I have accomplished the objects of my invention. An improved inhibitor has been provided for preventing the deposition of adherent scale of calcium sulfate from brines such as those occurring in oil fields. A modified form of this inhibitor has been described which will act to inhibit deposition of both sulfate and carbonate scales. In particular, an inhibitor composition has been provided which will prevent the deposition of both carbonate and sulfate scale from oil field brines in heater treaters. The scale inhibitor, being effective for preventing sulfate scale, will also prevent the corrosion which sometimes occurs under such scale. A pellet form of scale inhibitor is provided which is strong, disperses slowly and evenly in water, and has a sufficiently high density to fall through oil field liquids.

I claim:
1. A method for inhibiting the deposition and adherence of calcium sulfate scale on surfaces exposed to brines containing at least about 1,000 parts per million by weight of dissolved salts comprising dispersing into said brine between about 3 and about 50 parts per million by weight of a carboxymethyl cellulose salt of a monovalent cation selected from the group consisting of the alkali metals and ammonium.

2. The method of claim 1, in which said carboxymethyl cellulose salt is sodium carboxymethyl cellulose.

3. The method of claim 2 in which said sodium carboxymethyl cellulose has an average of between about 0.3 and about 1.0 carboxymethyl group per anhydroglucose unit.

4. A method for inhibiting the deposition and adherence of both calcium sulfate and calcium carbonate scale on surfaces exposed to brines containing at least about 1,000 parts per million by weight of dissolved salts comprising dispersing in said brine between about 3 and about 50 parts per million by weight of a mixture containing between about 50 and 85 percent by weight of an alkali metal carboxymethyl cellulose and between about 15 and 50 percent by weight of a polyphosphate selected from the group consisting of water soluble metaphosphates containing more than three phosphorous atoms per molecule, water soluble pyrophosphates having no more than two hydrogen atoms per molecule and water soluble chemical combinations of metaphosphates and pyrophosphates containing at least one metaphosphate group for each pyrophosphate group.

5. The method of claim 4 in which said polyphosphate is sodium tripolyphosphate.

6. The method of claim 5 in which said carboxymethyl cellulose salt is sodium carboxymethyl cellulose.

7. The method of claim 6 in which said sodium carboxymethyl cellulose has an average of between 0.3 and about 1.0 carboxymethyl group per anhydroglucose unit.

8. A scale-inhibiting composition in pellet form comprising from about 40 to about 90 percent by weight of an alkali metal carboxymethyl cellulose and from about 10 to about 60 percent by weight of a polyhydroxy organic compound having a melting point between about 150° F. and about 350° F. and having attached to each carbon atom at least one radical selected from the group consisting of hydroxyl and double bond oxygen radicals said composition having been compressed in powdered form in a mold under a molding pressure of at least about 100 pounds per square inch and at a temperature less than about 250° F. but sufficient to cause partial melting of said composition.

9. The pellet of claim 8 in which said alkali metal carboxymethyl cellulose is sodium carboxymethyl cellulose.

10. The pellet of claim 8 in which said polyhydroxy organic compound is a monosaccharide.

11. A scale-inhibiting composition in pellet form comprising from about 40 to about 90 percent by weight of a mixture consisting of from one to five parts of an alkali metal carboxymethyl cellulose and one part of a polyphosphate selected from the group consisting of water soluble metaphosphates containing more than three phosphorous atoms per molecule, water soluble pyrophosphates having no more than two hydrogen atoms per molecule and water soluble chemical combinations of metaphosphates and pyrophosphates containing at least one metaphosphate group for each pyrophosphate group; and from about 10 to about 60 percent by weight of a polyhydroxy organic compound having a melting point between about 150° F. and about 350° F. and having attached to each carbon atom at least one radical selected from the group consisting of hydroxyl and double bond oxygen radicals said composition having been compressed in powdered form in a mold under a molding pressure of at least about 100 pounds per square inch and at a temperature less than about 250° F. but sufficient to cause partial melting of said composition.

12. The pellet of claim 11 in which said alkali metal carboxymethyl cellulose is sodium carboxymethyl cellulose.

13. The pellet of claim 11 in which polyhyroxy organic compound is a monosaccharide.

14. The pellet of claim 11 in which said polyphosphate is sodium tripolyphosphate.

15. A scale inhibiting composition in pellet form comprising about 60 percent by weight of sodium carboxymethyl cellulose, about 20 percent by weight of sodium tripolyphosphate, and about 20 percent by weight of dextrose, said composition having been compressed in powdered form in a mold under a molding pressure of at least about 100 pounds per square inch and at a temperature between about 190° F. and about 230° F.

16. The method of preparing a pellet form of a composition containing at least about 30 percent by weight of an alkali metal carboxymethyl cellulose comprising compressing in a mold a mixture of from about 40 to about 90 percent by weight of said composition and from about 10 to about 60 percent by weight of a polyhydroxy organic compound having a melting point between about 150° F. and about 350° F. and having attached to each carbon atom a radical selected from the group consisting of hydroxyl and double bond oxygen radicals said composition and said polyhydroxy organic compound being in powdered form, the molding pressure being at least about 100 pounds per square inch and the temperature being less than about 250° F. but sufficient to cause partial melting of the mixture of powders.

17. The method of claim 16 in which said polyhydroxy organic compound is a monosaccharide.

18. The method of preparing a pellet form of a composition containing from one to five parts of sodium carboxymethyl cellulose and one part of sodium tripolyphosphate comprising mixing from about 40 to about 90 percent by weight of said composition in powdered form with from about 10 to about 60 percent of dextrose in powdered form and compressing the resulting mixture in a mold at a molding pressure of at least about 100 pounds per square inch and at a temperature of from about 190° F. to about 230° F.

References Cited in the file of this patent

UNITED STATES PATENTS

| | | |
|---|---|---|
| 2,593,057 | Savoy | Apr. 15, 1952 |
| 2,594,421 | Gluesenkamp | Apr. 29, 1952 |
| 2,594,431 | Harris et al. | Apr. 29, 1952 |
| 2,658,036 | Core et al. | Nov. 3, 1953 |
| 2,764,242 | Rohrback et al. | Sept. 25, 1956 |
| 2,795,560 | Williams | July 11, 1957 |

OTHER REFERENCES

Hollabaugh et al.: Carboxymethylcellulose Uses and Applications, article in Ind. and Eng. Chem., vol. 37, October 1945, pages 943–947.